United States Patent
Matsumoto et al.

(10) Patent No.: US 11,496,646 B2
(45) Date of Patent: Nov. 8, 2022

(54) PRINTING APPARATUS THAT RESTRAINS POSITIONAL DEVIATION AND A PRINTING METHOD USING THE SAME

(71) Applicant: SCREEN HOLDINGS CO., LTD., Kyoto (JP)

(72) Inventors: Ippei Matsumoto, Kyoto (JP); Kazuki Fukui, Kyoto (JP); Kunio Muraji, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/426,449

(22) PCT Filed: Dec. 24, 2019

(86) PCT No.: PCT/JP2019/050584
§ 371 (c)(1),
(2) Date: Jul. 28, 2021

(87) PCT Pub. No.: WO2020/194949
PCT Pub. Date: Oct. 1, 2020

(65) Prior Publication Data
US 2022/0086306 A1     Mar. 17, 2022

(30) Foreign Application Priority Data

Mar. 25, 2019   (JP) .............................. JP2019-056350

(51) Int. Cl.
*H04N 1/38*        (2006.01)
*H04N 1/387*      (2006.01)
(Continued)

(52) U.S. Cl.
CPC .......... *H04N 1/3878* (2013.01); *B41J 2/2054* (2013.01); *B41J 2/2132* (2013.01);
(Continued)

(58) Field of Classification Search
CPC combination set(s) only.
See application file for complete search history.

(56) References Cited

U.S. PATENT DOCUMENTS

| 11,077,690 B2 * | 8/2021 | Muramatsu ............ B41J 2/2135 |
| 2016/0067957 A1 | 3/2016 | Hisaoka et al. |
| 2017/0187918 A1 | 6/2017 | Fukui et al. |

FOREIGN PATENT DOCUMENTS

| JP | 2016-055518 A | 4/2016 |
| JP | 2017-114054 A | 6/2017 |
| JP | 6260200 B2 * | 1/2018 |

OTHER PUBLICATIONS

International Search Report issued in corresponding International Patent Application No. PCT/JP2019/050584, dated Mar. 24, 2020, with English translation.

* cited by examiner

*Primary Examiner* — Barbara D Reinier
(74) *Attorney, Agent, or Firm* — McDermott Will & Emery LLP

(57) ABSTRACT

An image shifter creates plural pairs of shift image data. A shading corrector and a halftone dot processor create halftone shift image data from shift images. Further, a difference image creator creates halftone common image data which is a common part of a pair of halftone shift image data, and creates halftone positive difference image data and halftone negative difference image data each of which is a difference between the halftone common image data and one of a pair of halftone shift image data. A composite image creator synthesizes the halftone common image data corresponding to an amount of positional deviation, and the halftone positive difference image data or halftone negative difference image data. A controller executes printing on web paper. Since the image data is only synthesized, processing (Continued)

load can be lightened even if printing is performed to restrain positional deviations.

5 Claims, 16 Drawing Sheets

(51) Int. Cl.
    *B41J 2/205*           (2006.01)
    *B41J 2/21*            (2006.01)
    *H04N 1/405*          (2006.01)
    *H04N 1/60*           (2006.01)

(52) U.S. Cl.
    CPC ........... *B41J 2/2135* (2013.01); *B41J 2/2146* (2013.01); *H04N 1/4052* (2013.01); *H04N 1/6041* (2013.01)

d1

→ SHIFT BY TWO PIXELS IN POSITIVE DIRECTION d2(+2)

SHIFT BY TWO PIXELS IN NEGATIVE ← DIRECTION d3(-2)

d4(±2)

d5(+2)

d6(-2)

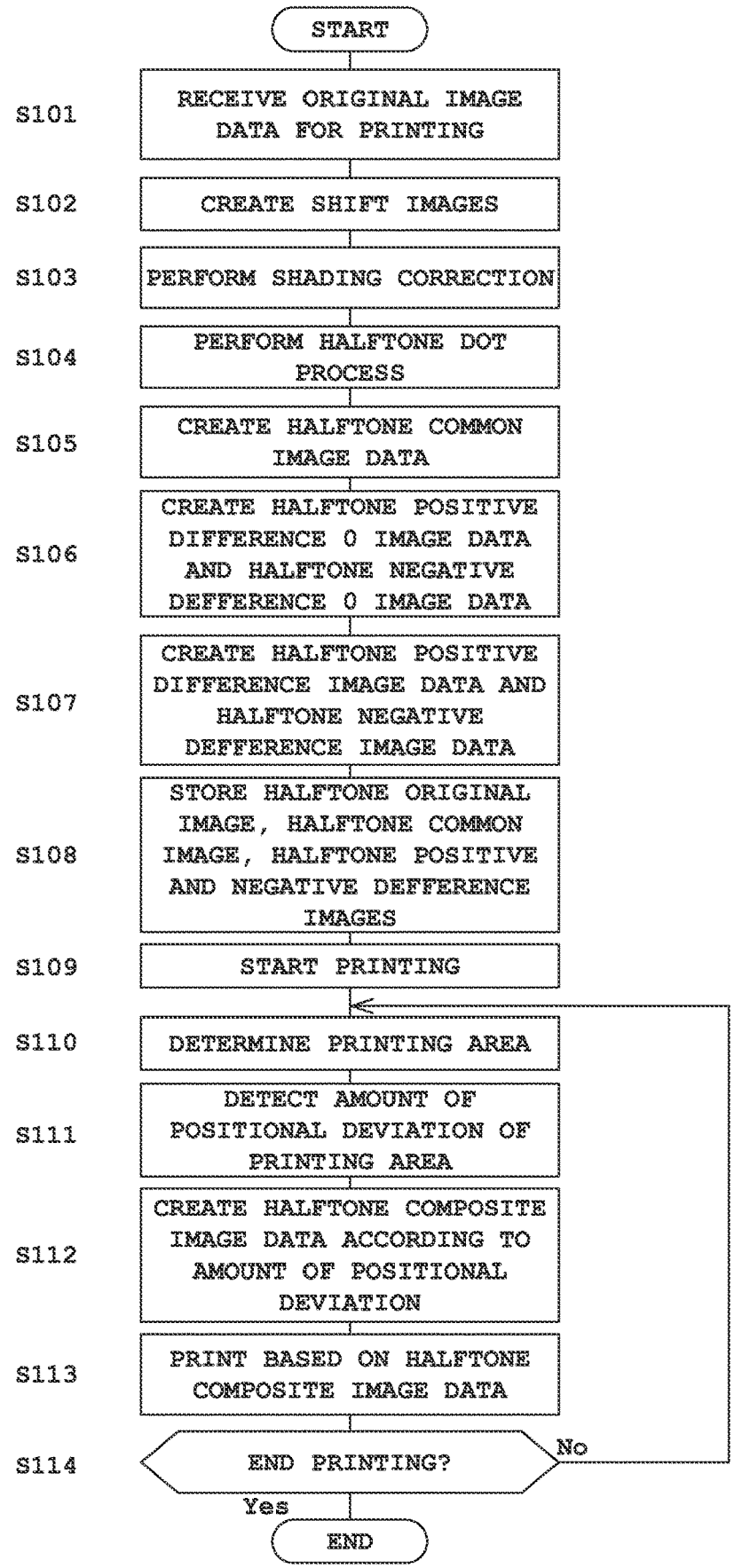

d11 d12(+1)

SHIFT BY ONE PIXEL IN POSITIVE DIRECTION d12(+2)

SHIFT BY TWO PIXELS IN POSITIVE DIRECTION d13(-1)

SHIFT BY ONE PIXEL IN NEGATIVE DIRECTION d13(-2)

SHIFT BY TWO PIXELS IN NEGATIVE DIRECTION d14(±0)

d11 d14(±0)

d16(±0)    d15(±0)

d12(+1)

d14(±0)

d15(±0)

d15(+1)L    d15(+1)R d13(-1)

d14(±0)

d16(±0)

d16(-1)L d16(-1)R d12(+2)

d14(±0)

d15(±0)

d15(+1)L  d15(+1)R d15(+2)L  d15(+2)R d13(-2)

d14(±0)

d16(±0)

d16(-1)L    d16(-1)R d16(-2)L    d16(-2)R d14(±0)

d15(±0)

d15(+1)          d15(+1)

d12(+1)

d14(±0)

d15(±0)

d15(+1)L  d15(+1)R d15(+2)L  d15(+2)R d12(+2)

d14(±0)

d16(±0)

d16(-1)L  d16(-1)R d16(-2)L  d16(-2)R d13(-2)

PRINTING APPARATUS THAT RESTRAINS POSITIONAL DEVIATION AND A PRINTING METHOD USING THE SAME

CROSS REFERENCE

This application is the U.S. National Phase under 35 U.S.C. § 371 of International Application No. PCT/JP2019/050584, filed on Dec. 24, 2019, which claims the benefit of Japanese Application No. 2019-056350, filed on Mar. 25, 2019, the entire contents of each are hereby incorporated by reference.

TECHNICAL FIELD

This invention relates to a printing apparatus and a printing method for printing on a printing medium with a print head.

BACKGROUND ART

Conventionally, a known apparatus of this type includes a print head, a detector, an image creator, a shading corrector, a halftone dot processor, a memory, and a controller.

The print head has a plurality of nozzles arranged in a width direction perpendicular to a transport direction in which web paper is transported. The detector detects a position of an end face of the web paper relative to a reference line set in the width direction of the web paper. The image creator receives print image data which is data for printing, and creates shift image data by shifting the print image data according to an amount of positional deviation received from the detector. The shading corrector creates corrected image data by correcting the shift image data according to dispensing characteristics of each nozzle of the print head. The halftone dot processor performs a halftone dot process on the corrected image data. The memory stores halftone image data having gone through the halftone dot process. The controller operates the print head based on the halftone image data in the memory to print on the web paper. By executing printing in this way, even when the web paper skews, positional deviations of images in the width direction can be restrained.

As apparatus for correcting amounts of positional deviation as described above, proposals have been made for conveniently performing corrections where amounts of positional deviation occur between the nozzles (see Patent Documents 1 and 2, for example).

PRIOR ART DOCUMENTS

Patent Documents

[Patent Document 1]
Unexamined Patent Publication No. 2016-55518
[Patent Document 2]
Unexamined Patent Publication No. 2017-114054

SUMMARY OF INVENTION

Technical Problem

However, the conventional example with such construction has the following problem.

That is, in the conventional apparatus, the image creator creates shift image data according to an amount of positional deviation detected by the detector, then the shift image data is put to the shading correction and the halftone dot process, and the resulting halftone image data is transferred to the memory. Thus, it is necessary to perform data processing and data transfer whenever a positional deviation is detected, and so it is necessary to perform data processing and data transfer at high speed, which poses a problem of heavy processing load. Since the cost of the apparatus increases to realize high-speed data processing and data transfer, it is an important problem to reduce the processing load for cost reduction. Such a problem becomes prominent especially with a printing method (also called a nonvariable printing) which performs printing with the same print image data for all pages.

In order to solve the above-mentioned problem, it is a conceivable method to assume positional deviations in a certain range, prepare beforehand a plurality of shift image data shifted in that range, and store the plurality of shift image data in the memory. However, this method gives rise to a different problem of requiring a very large memory for storing a plurality of shift image data, and thus fails to be a realistic solution.

This invention has been made having regard to the state of the art noted above, and its object is to provide a printing apparatus and a printing method therefor which can reduce a processing load even when printing is done in a way to restrain positional deviation.

Solution to Problem

To fulfill the above object, this invention provides the following construction.

The invention defined in claim 1 is a printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the apparatus comprising a detector for detecting positions in the width direction of an end face of the printing medium relative to a reference line; an image shifter for creating, based on an assumption of a pair of amounts of positional deviation by which the original image data deviates in the same distance positively and negatively in the width direction from the reference line, a pair of shift image data by shifting the original image data in the width direction according to the pair of amounts of positional deviation; a shading corrector for creating a pair of corrected shift image data from the pair of shift image data by performing a shading correction to uniform density variations according to dispensing characteristics of each nozzle among the plurality of nozzles; a halftone dot processor for performing a halftone dot process to express contrast in images, on the pair of corrected shift image data, thereby to create a pair of halftone shift image data; a difference image creator for creating halftone common image data which is a common part of the pair of halftone shift image data, respectively, creating halftone positive difference image data and halftone negative difference image data which are differences between the halftone common image data and the halftone positive difference image data and halftone negative difference image data, respectively, further creating the halftone common image data, the halftone positive difference image data, and the halftone negative difference image data by a pair of positional deviation with the distance changed, and creating the halftone common image data, the halftone positive difference image data, and the halftone negative difference image data for each of plural pairs of amounts of positional deviation; a memory for storing the halftone common image data, the halftone positive difference image data, and the halftone negative difference image data as associated with the plural pairs of amounts of positional deviation; a composite image creator for creating halftone composite image data, based on the amounts of positional deviation received from the detector, and by reading from the memory and synthesizing the halftone positive difference image data or the halftone negative difference image data and the halftone common image data corresponding to the amounts of positional deviation in a position of the print head; and a controller for operating the print head to print on the printing medium based on the halftone composite image data.

[Functions and effects] According to the invention defined in claim 1, the image shifter creates a pair of shift image data from the original image data. The shading corrector performs a shading correction on the pair of shift image data, and creates a pair of corrected shift image data. The halftone dot processor performs a halftone dot process on the pair of corrected shift image data, and creates a pair of halftone shift image data. The difference image creator creates halftone common image data which is a common part of the pair of halftone shift image data, respectively, and creates halftone positive difference image data and halftone negative difference image data which are differences between the halftone common image data and the halftone positive difference image data and halftone negative difference image data, respectively. The memory stores the halftone common image data, halftone positive difference image data, and halftone negative difference image data as associated with the plural pairs of amounts of positional deviation. The composite image creator reads from the memory and synthesizes the halftone common image data, halftone positive difference image data or halftone negative difference image data corresponding to the amounts of positional deviation received from the detector. The controller operates the print head to print on the printing medium based on the halftone composite image data. Consequently, even if a positional deviation of the printing medium occurs, what is done is only synthesize the halftone positive difference image data or halftone negative difference image data and halftone common image data read from the memory to create halftone composite image data. Thus, processing load can be lightened even with printing performed to restrain positional deviations.

This invention also provides a printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the apparatus comprising a detector for detecting positions in the width direction of an end face of the printing medium relative to a reference line; an image shifter for creating, based on an assumption of amounts of positional deviation in the width direction from the reference line, a plurality of shift image data by shifting the original image data in the width direction according to the amounts of positional deviation; a shading corrector for creating corrected original image data and a plurality of corrected shift image data by performing a shading correction on the original image data and the shift image data to uniform density variations according to dispensing characteristics of each nozzle among the plurality of nozzles; a halftone dot processor for performing a halftone dot process to express contrast in images, on the corrected original image data and the plurality of corrected shift image data, thereby to create halftone original image data and a plurality of halftone shift image data; a difference image creator for creating halftone common image data which is a common part of the halftone original image data and the plurality of halftone shift image data, respectively, creating halftone positive difference image data and halftone negative difference image data which are differences between the halftone common image data and the halftone positive difference image data and halftone negative difference image data, respectively, obtaining halftone difference zero image data which is a difference between the halftone original image data and the halftone common image data, and subtracting the halftone common image data and the halftone difference zero image data from each halftone shift image data, thereby obtaining halftone difference image data for each of the plurality of halftone shift image data; a memory for storing the halftone common image data and the halftone difference zero image data, and storing the plurality of halftone difference image data as associated with the amounts of positional deviation; a composite image creator for creating halftone composite image data, based on the amounts of positional deviation received from the detector, and by reading from the memory the halftone difference image data corresponding to the amounts of positional deviation in a position of the print head and synthesizing the read-out halftone difference image data with the halftone common image data and the halftone difference zero image data; and a controller for operating the print head to print on the printing medium based on the halftone composite image data; wherein the difference image creator is configured to create the plurality of halftone difference image data in a way to avoid a mutual overlapping of the image data.

[Functions and effects] According to the invention defined in claim 2, even if a positional deviation of the printing medium occurs, what is done is only read from the memory the halftone common image data and halftone difference zero image data, and the halftone difference image data corresponding to the amount of positional deviation, which are synthesized by the composite image creator to create the halftone composite image data. Thus, processing load is not increased even with printing performed to restrain positional deviations. Further, the difference image creator creates the plurality of halftone difference image in a way not to make a mutual overlapping of the image data. This restrains the data amount of the halftone difference image data to be stored in the memory.

In this invention, it is preferred that the detector is disposed upstream in the transport direction of the print head (claim 3).

Amounts of positional deviation of the printing medium at the print head can be obtained from the positional relationship between the position of the end face of the printing medium detected on the upstream side and the print head. Consequently, the positional deviations in the print head position can be restrained in response to the amounts of positional deviation.

The invention in claim 4 provides a printing method for a printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the method comprising a receiving step for receiving the original image data; a shift image creating step for creating, based on an assumption, regarding positions in the width direction of an end face of the printing medium relative to a reference line, that a pair of amounts of positional deviation occur in the same distance positively and negatively in the width direction from the reference line, a pair of shift image data by shifting the original image data in the width direction according to the pair of amounts of positional deviation; a shading correcting step for creating a pair of corrected shift image data from the pair of shift image data by performing a shading correction to uniform density variations according to dispensing characteristics of each nozzle among the plurality of nozzles; a halftoning step for performing a halftone dot process to express contrast in images, on the pair of corrected shift image data, thereby to create a pair of halftone shift image data; a difference image creating step for creating halftone common image data which is a common part of the pair of halftone shift image data, respectively, creating halftone positive difference image data and halftone negative difference image data which are differences between the halftone common image data and the halftone positive difference image data and halftone negative difference image data, respectively, further creating the halftone common image data, the halftone positive difference image data, and the halftone negative difference image data by a pair of positional deviation with the distance changed, and creating the halftone common image data, the halftone positive difference image data, and the halftone negative difference image data for each of plural pairs of amounts of positional deviation; a storing step for storing in memory the halftone common image data, the halftone positive difference image data, and the halftone negative difference image data as associated with the plural pairs of amounts of positional deviation; a halftone composite image creating step for creating halftone composite image data, based on the amounts of positional deviation received from the detector, and by reading from the memory and synthesizing the halftone positive difference image data or the halftone negative difference image data and the halftone common image data corresponding to the amounts of positional deviation in a position of the print head; and a printing step for operating the print head to print on the printing medium based on the halftone composite image data.

[Functions and effects] According to the invention defined in claim 4, it is possible to produce the same effect as does the printing apparatus in claim 1.

The invention in claim 5 provides a printing method for a printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the method comprising a receiving step for receiving the original image data; a shift image creating step for creating, based on an assumption, regarding positions in the width direction of an end face of the printing medium relative to a reference line, that amounts of positional deviation occur in the width direction from the reference line, a plurality of shift image data by shifting the original image data in the width direction according to the amounts of positional deviation; a shading correcting step for creating corrected original image data and a plurality of corrected shift image data by performing a shading correction on the original image data and the shift image data to uniform density variations according to dispensing characteristics of each nozzle among the plurality of nozzles; a halftoning step for performing a halftone dot process to express contrast in images, on the corrected original image data and the plurality of corrected shift image data, thereby to create halftone original image data and a plurality of halftone shift image data; a difference image creating step for creating halftone common image data which is a common part of the halftone original image data and the plurality of halftone shift image data, respectively, creating halftone positive difference image data and halftone negative difference image data which are differences between the halftone common image data and the halftone positive difference image data and halftone negative difference image data, respectively, obtaining halftone difference zero image data which is a difference between the halftone original image data and the halftone common image data, and subtracting the halftone common image data and the halftone difference zero image data from each halftone shift image data, thereby obtaining halftone difference image data for each of the plurality of halftone shift image data; a storing step for storing the halftone common image data and the halftone difference zero image data, and storing the plurality of halftone difference image data as associated with the amounts of positional deviation; a composite image creating step for creating halftone composite image data, based on the amounts of positional deviation detected, and by reading from the memory the halftone difference image data corresponding to the amounts of positional deviation in a position of the print head for synthesis with the halftone common image data and the halftone difference zero image data; and a printing step for operating the print head to print on the printing medium based on the halftone composite image data; wherein the difference image creating step is executed to create the plurality of halftone difference image data in a way to avoid a mutual overlapping of the image data.

[Functions and effects] According to the invention defined in claim 5, it is possible to produce the same effect as does the printing apparatus in claim 2.

Advantageous Effects of Invention

The printing apparatus according to this invention can lighten processing load even with printing performed to restrain positional deviations when the positional deviations occur to a printing medium.

BRIEF DESCRIPTION OF THE DRAWINGS

FIG. 7 is a flow chart showing a printing process in a modified example.

DESCRIPTION OF EMBODIMENTS

An embodiment of this invention will be described hereinafter with reference to the drawings.

Figure 1:
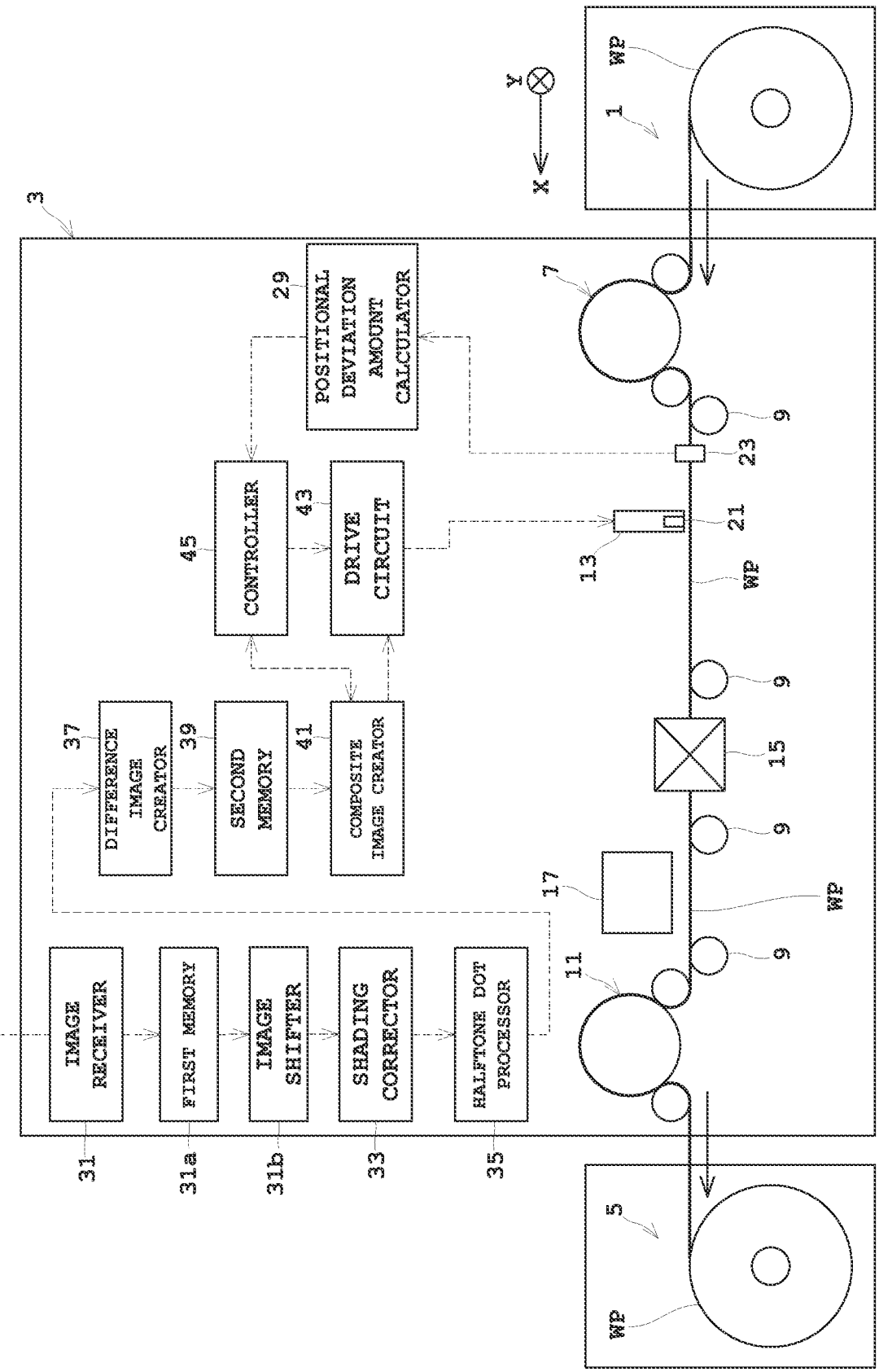
FIG. 1 is an outline schematic view showing an entire inkjet printing system according to an embodiment.
Figure 2:
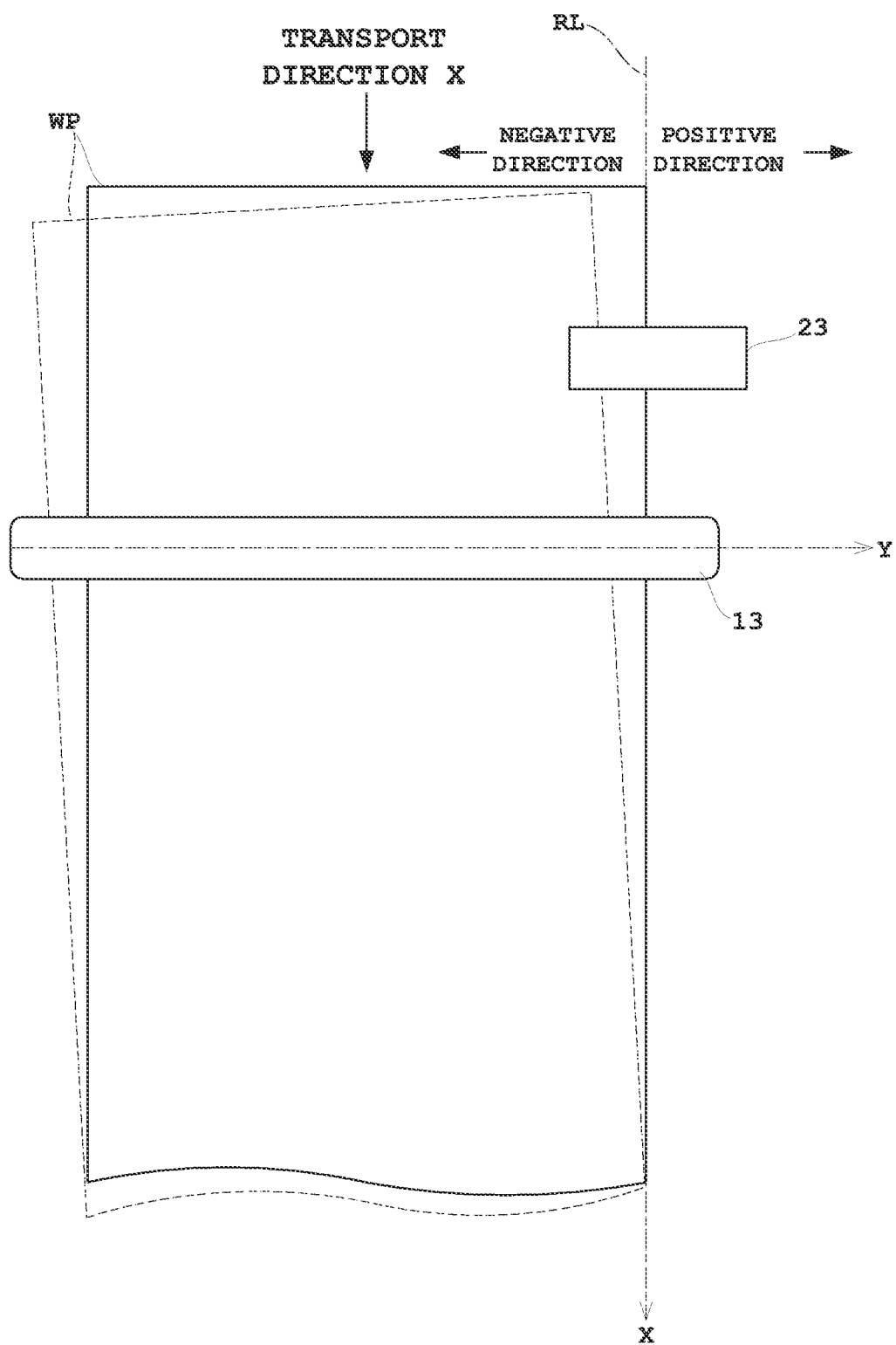
FIG. 2 is a schematic view showing a positional relationship between a print head and a detector in plan view.

FIG. 1 is an outline schematic diagram showing an entire inkjet printing system according to an embodiment. FIG. 2 is a schematic view showing a positional relationship between a print head and a detector in plan view.

The inkjet printing system according to this embodiment includes a paper feeder 1, an inkjet printing apparatus 3, and a takeup roller 5.

The paper feeder 1 holds web paper WP in a roll form to be rotatable about a horizontal axis, and unwinds and feeds the web paper WP to the inkjet printing apparatus 3. The takeup roller 5 takes up on a horizontal axis the web paper WP printed in the inkjet printing apparatus 3. Referring to the side of feeding the web paper WP as upstream and that of discharging the web paper WP as downstream, the paper feeder 1 is located upstream of the inkjet printing apparatus 3, and the takeup roller 5 downstream of the inkjet printing apparatus.

The inkjet printing apparatus 3 includes a drive roller 7 disposed in an upstream position for taking in the web paper WP from the paper feeder 1. The web paper WP unwound from the paper feeder 1 by the drive roller 7 is transported downstream along a plurality of transport rollers 9 toward the takeup roller 5. A drive roller 11 is disposed between the most downstream transport roller 9 and the takeup roller 5. This drive roller 11 feeds the web paper WP transported on upper surfaces of the transport rollers 9 forward toward the takeup roller 5. In the following description, the transport direction in which the web paper WP is transported will be referred to as X direction, and the width direction of web paper WP horizontally perpendicular to the transport direction X as Y direction.

The above inkjet printing apparatus 3 corresponds to the "printing apparatus" in this invention. The above web paper WP corresponds to the "printing medium" in this invention. The drive rollers 7 and 9 and transport roller 9 correspond to the "transport device" in this invention.

The inkjet printing apparatus 3 has a print head 13, a dryer 15 and a tester 17 arranged in the stated order from upstream between the drive roller 7 and drive roller 11. The dryer 15 performs a drying process on portions printed by the print head 13. The tester 17 checks whether the printed portions have stains, omissions or other printing defects.

The print head 13 has a length exceeding the width of web paper WP, and is constructed capable of dispensing ink droplets over the full width of web paper WP. The print head 13 has a plurality of nozzles 21 arranged in the width direction Y.

A detector 23 is located upstream of the print head 13. This detector 23 is attached to a transport path frame (not shown) to which the drive roller 7 and the like are attached. The detector 23 is located at an end in the width direction Y of web paper WP for detecting by contact the position of a side edge in the width direction Y of web paper WP. Preferably, the detector 23 detects the position in noncontact mode, i.e. without contacting the side edge of web paper WP. As shown in FIG. 2, the detector 23 only detects the position of the end face of web paper WP by using a reference line RL as standard, and outputs the position. The position is calculated as an amount of positional deviation by a positional deviation amount calculator 29.

That is, using the reference line RL set beforehand as the standard representing the position of the side edge of web paper WP transported with no positional deviation, and based on the amount of deviation from the reference line RL, a distance between the print head 13 and detector 23, and positions of the end face of web paper WP detected in time series by the detector 23, the positional deviation amount calculator 29 calculates the position of the side edge of web paper WP directly under the nozzles 21 of the print head 13 as an amount of positional deviation. In this embodiment, for expediency, as shown in FIG. 2, it is assumed that, as seen from downstream in the transport direction X, rightward of the reference line RL is a positive direction, and leftward of the reference line RL a negative direction.

The inkjet printing apparatus 3 further includes an image receiver 31, a first memory 31a, an image shifter 31b, a shading corrector 33, a halftone dot processor 35, a difference image creator 37, a second memory 39, a composite image creator 41, a drive circuit 43, and a controller 45.

The image receiver 31 receives original print image data from a host computer as data for printing, for example. The original image data received by the image receiver 31 is stored in the first memory 31a. The image shifter 31b reads as appropriate the original image data from the first memory 31a, creates shift image data by shifting the original image data a predetermined distance in the positive direction or negative direction, and outputs it to the shading corrector 33. The image shifter 31b creates the shift image data while increasing the amount of positional deviation pixel by pixel in the positive direction or negative direction until it reaches an assumed maximum amount of positional deviation=±Max. Note that the image shifter 31b can also output the original image data as shift image data of shift amount "0" to the shading corrector 33.

The shading corrector 33 performs a shading correction on the original image data from the first memory 31a and the shift image data created by the image shifter 31b, thereby creating corrected original image data and corrected shift image data. The shading correction is to correct the original image data and shift image data, considering variations in the dispensing characteristics of the plurality of nozzles 21 of the print head 13, in order that the same signal given to all the nozzles 21 will result in the same density. That is, the shading correction is a process for uniforming density variations in response to the dispensing characteristics of the plurality of nozzles 21.

The halftone dot processor 35 performs a halftone dot process on the corrected original image data and corrected shift image data from the shading corrector 33. The halftone dot process is a process for determining a size of ink droplets and/or an arrangement of the ink droplets from each nozzle 21 in order to express contrast in images.

The difference image creator 37 performs the following process on the halftone original image data and halftone shift image data from the halftone dot processor 35 and having undergone the halftone dot process, to create halftone common image data, halftone positive difference image data, and halftone negative difference image data.

Reference is now made to FIGS. 3 and 4. FIGS. 3(a)-(f) and FIGS. 4(a)-(f) are schematic views illustrating creation of halftone positive difference image data and halftone negative difference image data. FIG. 3 shows a case of shifting by one pixel. FIG. 4 shows a case of shifting by two pixels. FIGS. 3 and 4 depict a shift amount of each image with exaggeration to facilitate understanding.

Figure 3A:
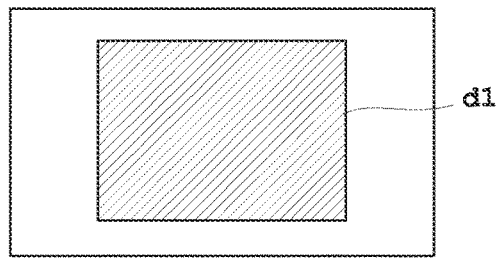
FIGS. 3(a)-(f) are schematic views illustrating creation of positive difference image data and negative difference image data.
Figure 3B:
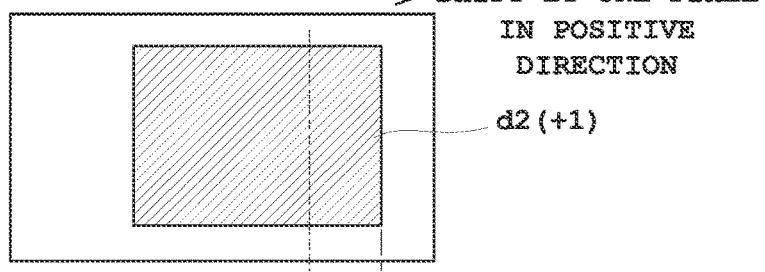
Figure 3C:
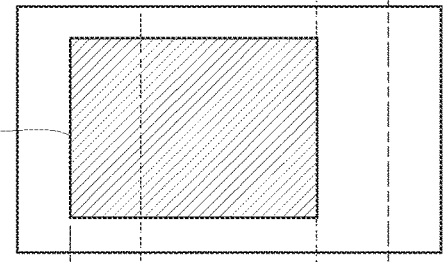
Figure 3D:
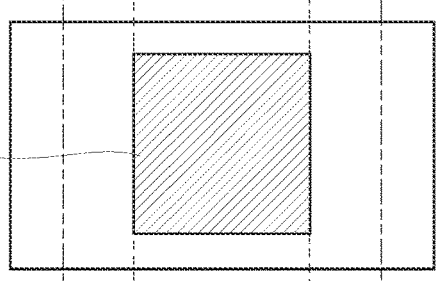
Figure 3E:
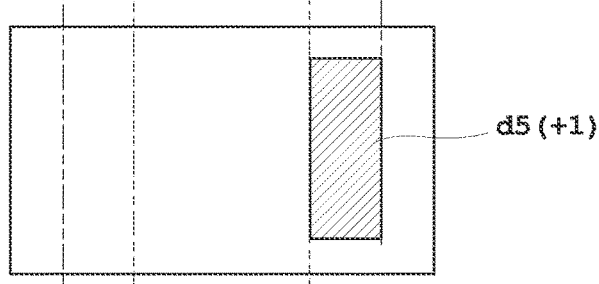
Figure 3F:
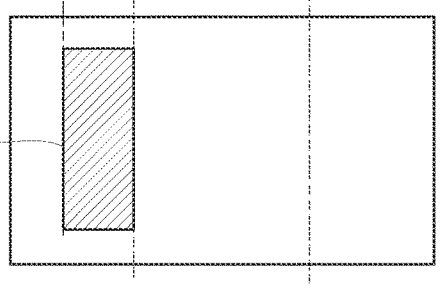

FIG. 3(a) shows halftone original image data d1 after the processes are performed by the shading corrector 33 and halftone dot processor 35 on the original image data for printing. On the other hand, FIG. 3(b) shows halftone shift image data d2(+1) which is the original image data for printing having been shifted a predetermined distance (corresponding to the above amount of positional deviation), for example, by one pixel, in the positive direction by the image shifter 31b, and thereafter the processes are performed by the shading corrector 33 and halftone dot processor 35. FIG. 3(c) shows halftone shift image data d3(−1) which is the original image data for printing having been shifted a predetermined distance (corresponding to the above amount of positional deviation), for example, by one pixel, in the negative direction by the image shifter 31b, and thereafter the processes are performed by the shading corrector 33 and halftone dot processor 35

The difference image creator 37 creates halftone common image data d4(±1) which is a common part of the pair of halftone shift image data d2(+1) and halftone shift image data d3(−1) created as described above (FIG. 3(d)). Further, halftone positive difference image data d5(+1) and halftone negative difference image data d6(−1) are created, which respectively are differences between the halftone common image data d4(±1) and the pair of shift image data, i.e. halftone shift image data d2(+1), d3(−1). Further, the same process is repeated a predetermined number of times while changing the predetermined distance. Description will be made on an assumption that the distance is changed up to two pixels. To avoid redundancy, the following description will be made with certain terms abbreviated, where appropriate, such as halftone original image data d1 to original image data d1, halftone shift image data d2 to shift image data d2, halftone shift image data d3 to shift image data d3, and halftone common image data d4 to common image data d4.

Figure 4A:
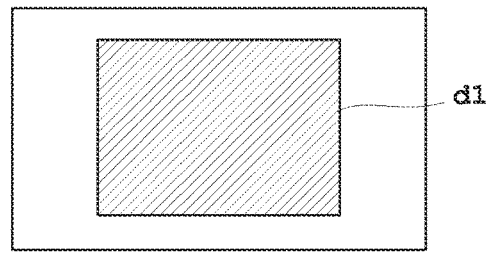
FIGS. 4(a)-(f) are schematic views illustrating creation of positive difference image data and negative difference image data.
Figure 4B:
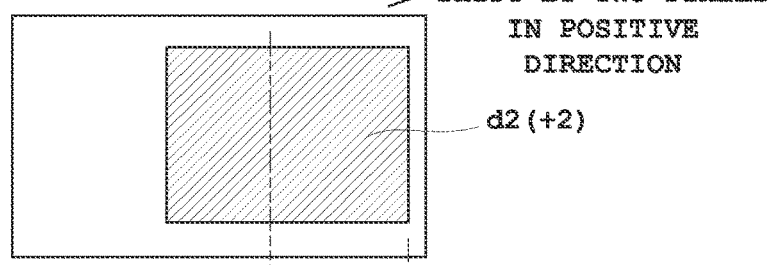
Figure 4C:
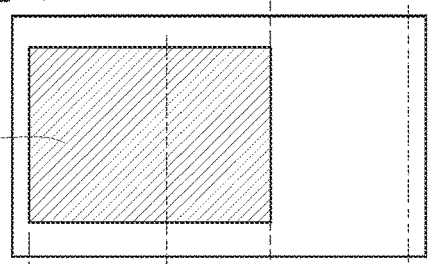
Figure 4D:
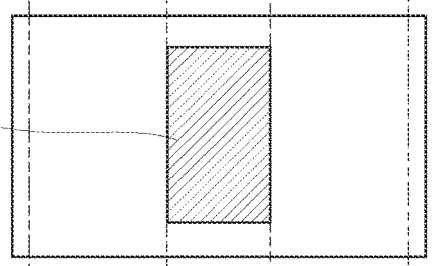
Figure 4E:
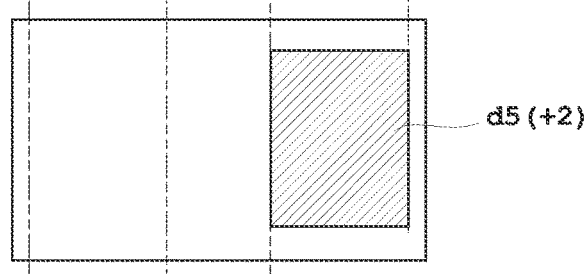
Figure 4F:
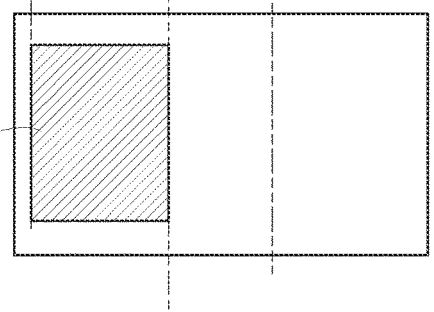

That is, shift image data d2(+2) (FIG. 4(b)) and shift image data d3(−2) (FIG. 4(c)) are created, which have undergone the shading process and halftone dot process, after the original image data for printing is shifted by the image shifter 31b by two pixels in the positive and negative directions. Further, common image data d4(±2) is created, which is a common part of the pair of halftone shift image data d2(+2) and halftone shift image data d3(−2) (FIG. 4(d)). Further, positive difference image data d5(+2) and negative difference image data d6(−2) are created, which respectively are differences between the common image data d4(±2) and the pair of shift image data d2(+2), d3(−2).

Figure 5:
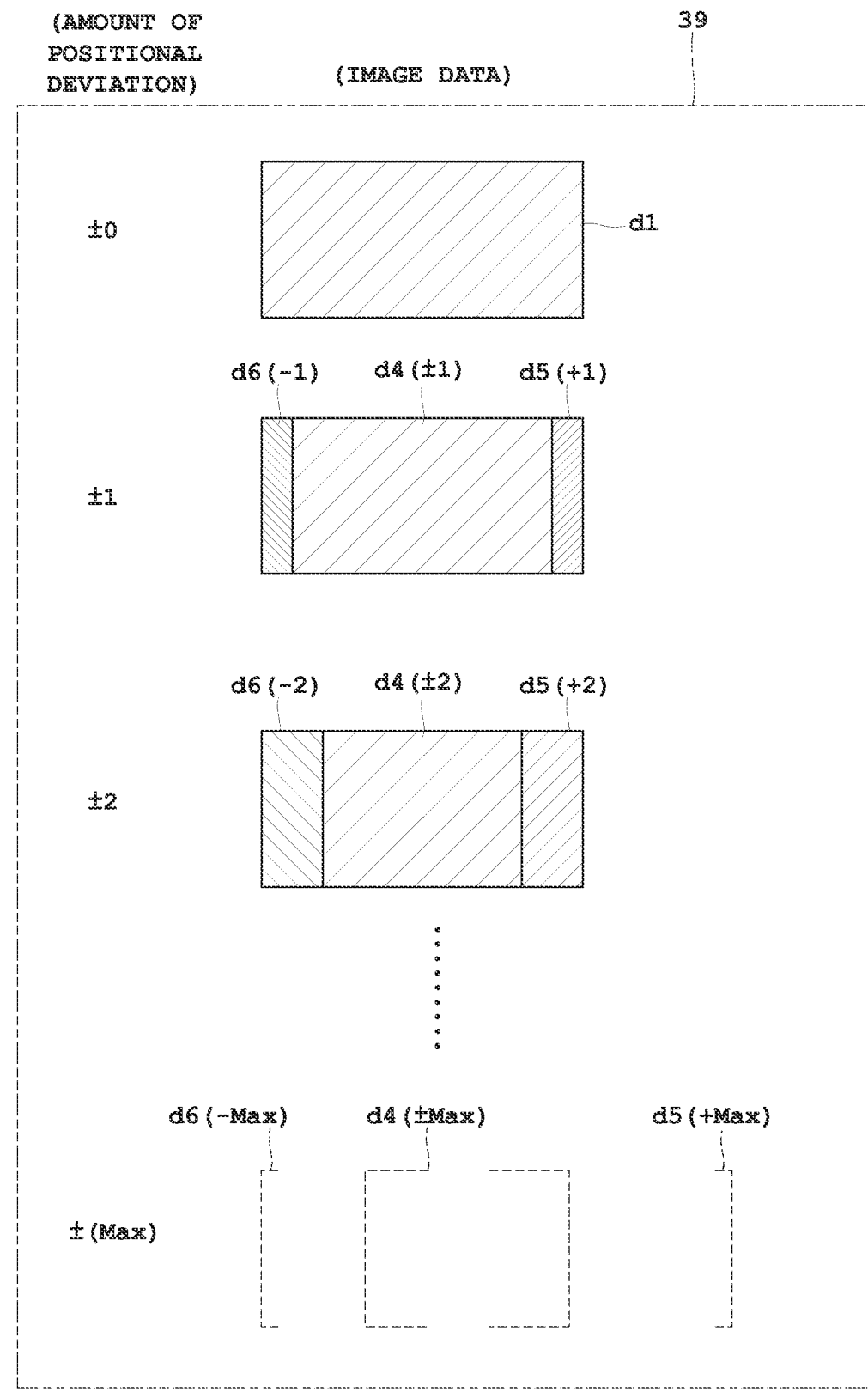
FIG. 5 is a schematic view showing a storage mode of a second memory.

The second memory 39 stores the common image data d4(±1), d4(±2), . . . , d4(±Max), positive difference image data d5(+1), d5(+2), . . . , d5(+Max), and negative difference image data d6(−1), d6(−2), . . . , d6(−Max) for each amount of positional deviation created as described above. Its storage mode is as shown in FIG. 5, for example. FIG. 5 is a schematic view showing the storage mode of the second memory 39.

Specifically, the second memory 39 stores common image data d4(±1), positive difference image data d5(+1), and negative difference image data d6(−1) as associated with the amount of positional deviation ±1 pixel, and stores common image data d4(±2), positive difference image data d5(+2), and negative difference image data d6(−2) as associated with the amount of positional deviation ±2 pixels. While changing the amount of positional deviation in this way, the second memory 39 stores up to common image data d4 (±Max), positive difference image data d5(+Max), and negative difference image data d6(−Max). That is, image data corresponding to each amount of positional deviation is stored. However, when the amount of positional deviation is 0, original image data d1 is stored as it is as difference 0 image data, for example. That is, only the image data corresponding to the amount of positional deviation 0 is stored as original image data d1 itself.

The composite image creator 41, on instructions from the controller 45, refers to the second memory 39, and reads out image data corresponding to amounts of positional deviation. The composite image creator 41 creates composite image data based on the image data read out.

Specifically, the controller 45 gives an amount of positional deviation calculated by the positional deviation amount calculator 29 to the composite image creator 41. The composite image creator 41 accesses the second memory 39, and creates composite image data by reading out and synthesizing one of the positive difference image data d5 and negative difference image data d6 corresponding to the amount of positional deviation, and the common image data d4 corresponding to the amount of positional deviation. However, the composite image creator 41, when the amount of positional deviation given by the controller 45 is 0, accesses the second memory 39 and creates the original image data d1 intact as composite image data.

The controller 45 operates the drive circuit 43 according to the composite image data created by the composite image creator 41, and the drive circuit 43 drives the plurality of nozzles 21 of the print head 13 to make prints on the web paper WP based on the composite image data. That is, the controller 45 operates the print head 13 through the drive circuit 43 to print on the web paper WP.

Figure 6:
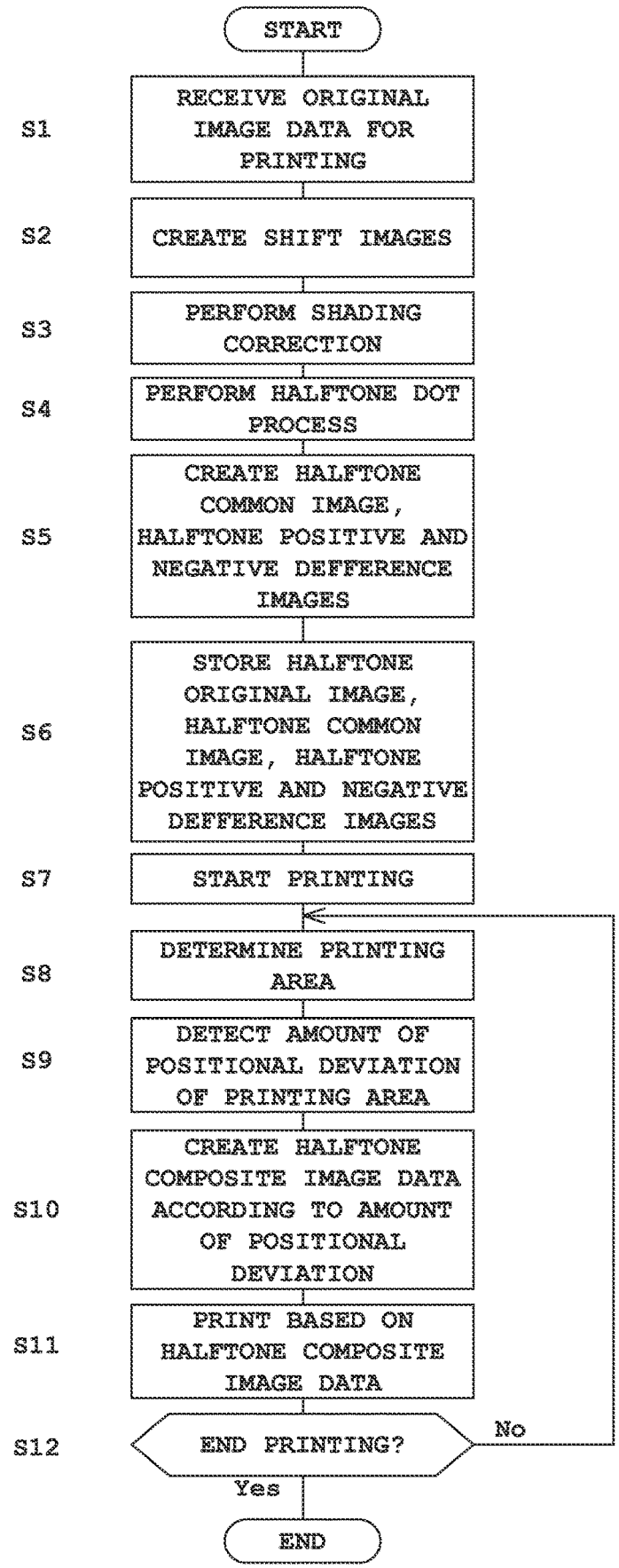
FIG. 6 is a flow chart showing a printing process.
Figure 8A:
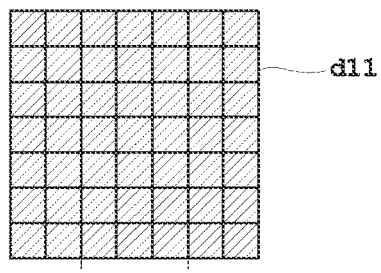
FIG. 8 is a schematic view illustrating creation of halftone common image data d14(±0).
Figure 8B:
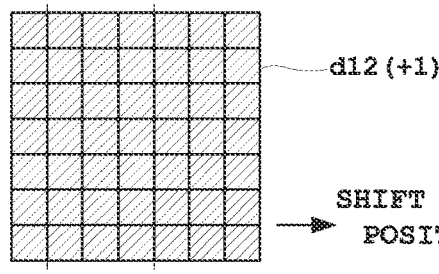
Figure 8C:
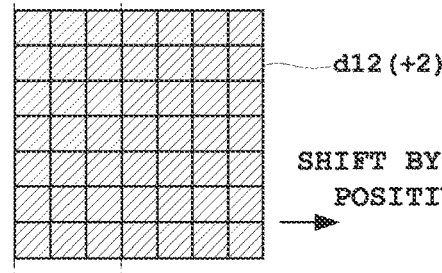
Figure 8D:
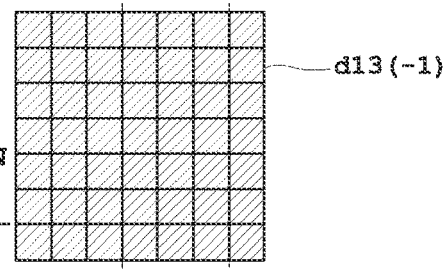
Figure 8E:
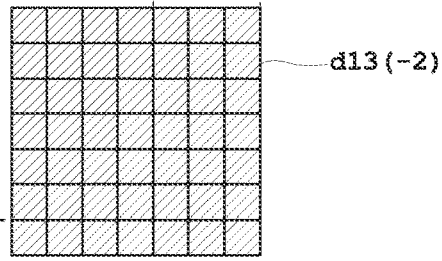
Figure 8F:
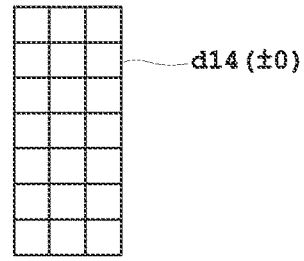

Next, the processes by the above inkjet printing system will be described with reference to FIG. 6. FIG. 6 is a flow chart showing a printing process.

Step S1

The image receiver 31 of the inkjet printing apparatus 3 receives original image data for printing from the host computer, and stores it in the first memory 31a, for example. This original image data for printing is data corresponding to the image, for example, of an entire printing area set to the web paper WP, or of part thereof with a definite width in the transport direction X.

Step S2

The image shifter 31b repeatedly reads the original image data stored in the first memory 31a, and creates a plurality of shift image data by shifting the original image data just a predetermined distance in the positive direction or negative direction.

Step S3

The shading corrector 33 receives the original image data stored in the first memory 31a and the shift image data created by the image shifter 31b, and performs a shading correction on these image data to suppress density variations. The corrected original image data and corrected shift image data having undergone the shading correction are given as corrected image data to the halftone dot processor 35.

Step S4

The halftone dot processor 35 performs the halftone dot process on the corrected original image data and shift image data to express contrast.

Step S5

The difference image creator 37, based on the halftone image data having undergone the halftone dot process, creates difference image data according to amounts of positional deviation in a certain constant range. The certain constant range may be determined from what amount of positional deviation is likely based on the experience of apparatus operation. This results in the creation of the common image data d4, positive difference image data d5, and negative difference image data d6 as described above. However, only the image data corresponding to 0 for amount of positional deviation becomes single image data which does not include the common image data d4 and so on.

Step S6

The original image data d1, and the common image data d4, positive difference image data d5 and negative difference image data d6 created in the above step S5, are stored as associated with the amounts of positional deviation in the second memory 39.

The process up to the above step S6 is a preliminary process leading to an actual start of printing.

Step S7

Next, the operator instructs from an input device not shown to the controller 45 to start printing the original image data for printing on the web paper WP. The controller 45, in response to these instructions, controls the drive rollers 7 and 9 to start transporting the web paper WP.

Step S8

The controller 45 determines a printing area on the web paper WP where the original image data should be printed.

Step S9

The positional deviation amount calculator 29, with reference to the output of the detector 23, calculates an amount of positional deviation of the web paper WP in the printing area determined as above, and gives it to the composite image creator 41.

Step S10

The composite image creator 41 reads image data corresponding to the amount of positional deviation from the second memory 39, and creates composite image data. When the amount of positional deviation is −1, for example, image data corresponding to the amount of positional deviation ±1 is selected from among the image data in the second memory 39 shown in FIG. 5. Further, common image data d4(±1) and negative difference image data d6(−1) are read from among the image data, and those image data are synthesized to create composite image data. However, when the amount of positional deviation is 0, the composite image creator 41 creates, as composite image data, original image data d1 corresponding to the amount of positional deviation ±0 among the image data in the second memory 39 shown in FIG. 5.

Step S11

The controller 45 operates the print head 13 through the drive circuit 43 to print on the web paper WP based on the composite image data. Consequently, even when a positional deviation occurs due to a skew of the web paper WP, a positional deviation of the printed image on the web paper WP can be suppressed.

Step S12

The controller 45 moves to step S8 when continuing to print the original image data for printing, and ends the printing when there is no need for continuation.

The above step S1 corresponds to the "receiving step" in this invention. Step S2 corresponds to the "shift image creating step" in this invention. Step S3 corresponds to the "shading correction step" in this invention. Step S4 corresponds to the "halftoning step" in this invention. Step S5 corresponds to the "difference image creating step" in this invention. Step S6 corresponds to the "storing step" in this invention. Step S10 corresponds to the "halftone composite image creating step" in this invention. Step S11 corresponds to the "printing step" in this invention.

According to this embodiment, the image shifter 31b shifts, in the width direction Y, the original image data for printing stored in the first memory 31a, to create plural pairs of shift image data d2(−1) and d3(+1), d2(−2) and d3(+2), . . . , d2(−x) and d3(+x). Further, halftone image data of the original image data and the plurality of shift image data are created by the shading corrector 33 and halftone processor 35.

The difference image creator 37 creates common image data d4(±1), d4(±2), . . . , d4(±2) which are common parts, respectively, of pairs of shift image data d2(−1) and d3(+1), d2(−2) and d3(+2), . . . , d2(−x) and d3(+x), and creates positive difference image data d5(+1), d5(+2), . . . , d5(+x) and negative difference image data d6(−1), d6(−2), . . . , d6(−x) which are differences respectively between the common image data d4(±1), d4(±2), . . . , d4(±x) and the pairs of shift image data. The composite image creator 41 reads from the second memory 39 and synthesizes common image data d4(±x) corresponding to the amount of positional deviation given from the detector 23, and positive difference image data d5 (+x) or negative difference image data d6 (−x). The controller 45 operates the print head 13 through the drive circuit 43 to make printing on the web paper WP based on the composite image data. Consequently, even if a positional deviation of the web paper WP occurs, what is done is only to synthesize the positive difference image data d5(+x) or negative difference image data d6(−x) and common image data d4(±x) read from the second memory 39. Thus, processing load can be lightened even with a printing performed to restrain positional deviations.

Suppose plural pairs of shift image data of deviations in the positive and negative directions by the same distance in the width direction from the certain reference line RL are stored beforehand in the second memory 39, in order to read and use selectively these data in response to a direction of deviation and an amount of positional deviation of the web paper WP, it would then be necessary to have stored beforehand in the second memory 39 two image data, i.e. the shift image data for the positive direction and the shift image data for the negative direction, for the same amount of deviation. In this embodiment, on the other hand, the common part of the shift image data of the positive direction and the shift image data of the negative direction is calculated and stored beforehand in the second memory 39. This allows the storage capacity of the second memory 39 to be reduced by an amount corresponding to the common part.

When the amount of positional deviation is 0 which indicates no positional deviation, the composite image creator 41 creates difference 0 image data intact as halftone composite image data. Consequently, since the synthesizing process is omissible, the load of the composite image creator 41 can be lightened.

From the positional relationship of the position of the end face of the web paper WP detected by the detector 23 upstream of the print head 13 and the print head 13, the amount of positional deviation of the web paper WP in the position of the print head 13 can be calculated. Consequently, in response to the amount of positional deviation, the positional deviation in the position of the print head 13 can be restrained.

This invention is not limited to the foregoing embodiment, but may be modified as follows:

(1) The foregoing embodiment has been described taking the case of nonvariable printing for example. In variable printing also in which printing is done based on print image data varied from page to page, printing based on the same image data for printing may be performed within the same page. In that case, this invention is applicable even to variable printing.

(2) In the foregoing embodiment, the storage mode in the second memory 39 is assumed to be the mode shown in FIG. 5. This invention is not limited to this form. It will be described below.

In the storage form of FIG. 5, for the respective different amounts of positional deviation (+1, +2, −1, −2, etc.), the common image data d4(±1, ±2), positive difference image data d5(+1, +2, etc.), and negative difference image data d6(−1, −2, etc.) are stored. In this case, the larger amount of displacement makes the larger sizes of positive difference image data d5 and negative difference image data d6, which poses a problem of increasing the data storage amount of the second memory 39.

A method will be described hereinafter of curbing the sizes of the positive difference image data d5 and negative difference image data d6.

Specifically, common image data d14(±0), positive difference 0 image data d15(±0), and negative difference 0 image data d16(±0) common to shift images of all the amounts of positional deviation (+1, +2, −1, −2, etc.) are created first. Next, differences between these common image data d14(±0) and positive difference 0 image data d15(±0), and positive shift image data d12(+1, +2, etc.) are obtained as positive difference image data d15(+1, +2 etc.). At this time, care should be taken to avoid overlapping of image data between the plurality of positive difference image data d15. Similarly, differences between the common image data d14(±0) and negative difference 0 image data d16(±0), and negative shift image data d13(−1, −2, etc.) are obtained as negative difference image data d16(−1, −2, etc.). At this time, overlapping of image data between the plurality of negative difference image data d16 should be avoided.

Figure 9A:
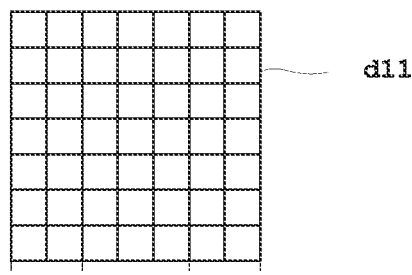
FIG. 9 is a schematic view illustrating creation of halftone positive difference 0 image data d15(±0) and halftone negative difference 0 image data d16(±0).
Figure 9B:
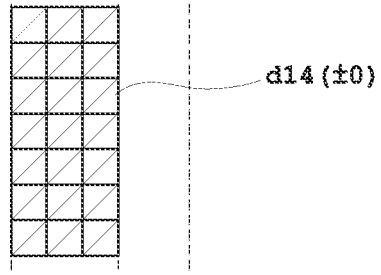
Figure 9C:
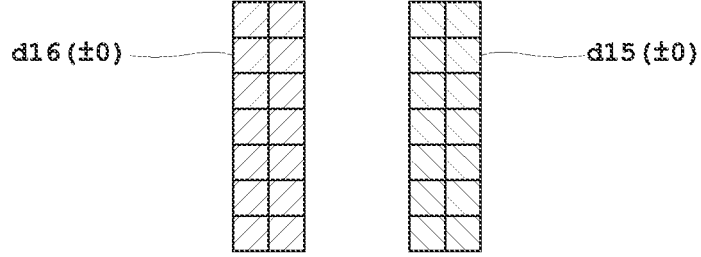

FIG. 7 is a flow chart showing a process of creating image data to be stored in the second memory 39 in the modified example. FIG. 8 is a schematic view illustrating creation of halftone common image data d14(±0) common to the halftone shift images for all amounts of positional deviation. FIG. 9 is a schematic view illustrating creation of the positive difference 0 image data d15(±0) and negative difference 0 image data d16(±0) common to shift images of all the amounts of positional deviation. FIG. 10 is a schematic view illustrating a process of creating halftone positive difference image data d15(+1) by subtracting the halftone common image data d14(±0) and halftone positive difference 0 image data d15(±0) from halftone positive shift image data d12(+1) having shifted one pixel in the positive direction. FIG. 11 is a schematic view illustrating a process of creating halftone negative difference image data d16 (−1) by subtracting the halftone common image data d14(±0) and halftone negative difference 0 image data d16(±0) from halftone negative shift image data d13(−1) having shifted one pixel in the negative direction. FIG. 12 is a schematic view illustrating a process of creating halftone positive difference image data d15(+2) by subtracting the halftone common image data d14(±0), halftone positive difference 0 image data d15(±0), and halftone positive difference image data d15(+2) from halftone positive shift image data d12(+2) having shifted two pixels in the positive direction. FIG. 13 is a schematic view illustrating a process of creating halftone negative difference image data d16(−2) by subtracting the halftone common image data d14(±0), halftone negative difference 0 image data d16(±0), and halftone negative difference image data d16(−2) from halftone negative shift image data d13(−2) having shifted two pixels in the negative direction.

First, the image receiver 31 (FIG. 1) receives original image data for printing from the host computer, and store it in the first memory 31a (S101 in FIG. 7). The image shifter 31b reads as appropriate the original image data from the first memory 31a, creates shift image data by shifting the original image data a predetermined distance in the positive direction or negative direction, and outputs it to the shading corrector 33 (S102 in FIG. 7). The image data shifter 31b creates the shift image data while increasing the amount of positional deviation pixel by pixel in the positive direction or negative direction until it reaches an assumed maximum amount of positional deviation=±Max. Note that the image shifter 31b can also output the original image data as shift image data of shift amount "0" to the shading corrector 33.

Next, the shading corrector 33 performs a shading correction on the original image data from the first memory 31a and the shift image data created by the image shifter 31b, thereby creating corrected original image data and corrected shift image data (S103 in FIG. 7).

The halftone dot processor 35 performs a halftone dot process on the corrected original image data and corrected shift image data from the shading corrector 33 (S104 in FIG. 7). Consequently, halftone original image data d11 and halftone shift image data d12 and d13 are created. To avoid redundancy, the following description will be made with certain terms abbreviated, where appropriate, such as halftone original image data d11 to original image data d11, and halftone shift image data d12, d13 to shift image data d12, d13.

The difference image creator 37 detects common parts between the original image data d11, positive shift images d12(+1, +2, . . . , +Max) of different amounts of positional deviation (+1, +2, . . . , +Max) in the positive direction, and negative shift images d13(−1, −2, . . . −Max) of different amounts of positional deviation (−1, −2, . . . , −Max) in the negative direction, and creates halftone common image data d14(±0) therefrom. FIG. 8 shows this process conceptually. It is assumed here that the maximum amount of positional deviation is two pixels in each of the positive and negative directions. From the original image data d11 shown in FIG. 8(a), positive shift image data d12(+1) and d12(+2) are created, respectively (FIG. 8(b), (c)). Similarly, negative shift image data d13(−1) and d13(−2) are created from the original image data d11, respectively (FIG. 8(d), (e)). Common parts of these original image data d11, positive shift image data d12(+1), d12(+2), and negative shift image data d13(−1), d13(−2) are detected, and are used to create common image data d14(±0) (FIG. 8(f), S105 in FIG. 7).

Next, the difference image creator 37 creates positive difference 0 image data d15(±0) and negative difference 0 image data d16(±0) (S106 in FIG. 7). That is, by subtracting the common image data d14(±0) created in step S105, from the original image data d11 shown in FIG. 9(a), positive difference 0 image data d15(±0) is created on the positive direction side of the common image data d14(±0), and negative difference 0 image data d16(±0) is created on the negative direction side of the common image data d14(±0) (FIG. 9(c)).

Next, the difference image creator 37 creates positive difference image data d15(+1, +2, etc.) for the respective different amounts of positive positional deviation (+1 pixel, +2 pixels, etc.), and creates negative difference image data d16(−1, −2, etc.) for the respective different amounts of negative positional deviation (−1 pixel, −2 pixels, etc.) (S107 in FIG. 7). FIG. 10 is a schematic view illustrating a process of creating positive difference image data d15(+1) from positive shift image data d12(+1) for the amount of positional deviation "+1 pixel". FIG. 11 is a schematic view illustrating a process of creating negative difference image data d16(−1) from negative shift image data d13(−1) for the amount of positional deviation "−1 pixel". FIG. 12 is a schematic view illustrating a process of creating positive difference image data d15(+2) from positive shift image data d12(+2) for the amount of positional deviation "+2 pixels". FIG. 13 is a schematic view illustrating a process of creating negative difference image data d16(−2) from negative shift image data d13(−2) for the amount of positional deviation "−2 pixels".

Figure 10A:
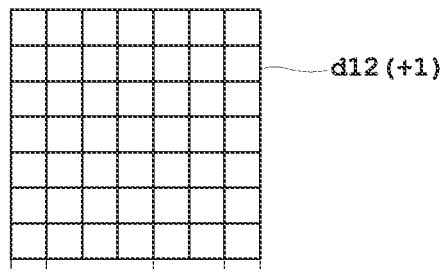
FIG. 10 is a schematic view illustrating creation of halftone positive difference image data d15(+1).
Figure 10B:
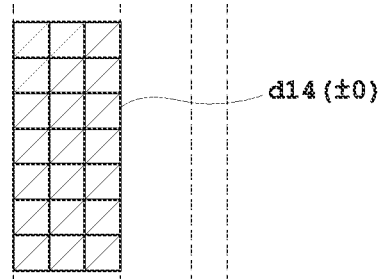
Figure 10C:
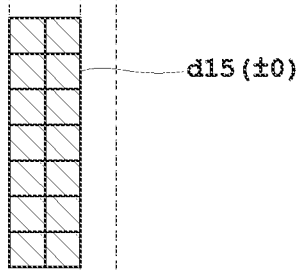
Figure 10D:
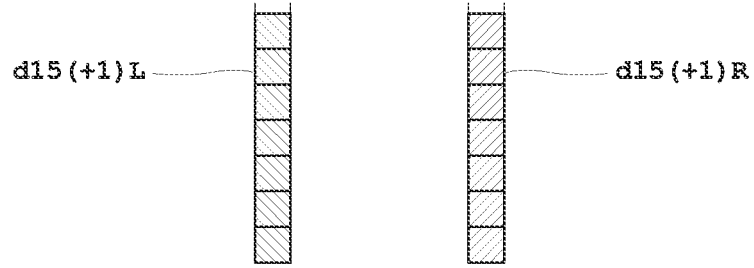

By subtracting the common image data d14(±0) and positive difference 0 image data d15(±0) from the positive shift image data d12(+1) shown in FIG. 10(a), positive difference image data d15(+1) are created as shown in FIG. 10(d). As shown in FIG. 10(d), the positive difference image data d15(+1) are created one each on the positive direction side and negative direction side of the common image data d14(±0). When these need to be distinguished in description, the positive difference image data d15(+1) on the positive direction side will be suffixed with "R" (right), and the positive difference image data d15(+1) on the negative direction side suffixed with "L" (left) The pair of these positive difference image data d15(+1) are stored as associated with the amount of positional deviation "+1 pixel" in the second memory 39 (S108 in FIG. 7).

Figure 11A:
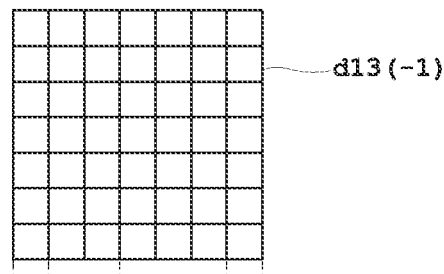
FIG. 11 is a schematic view illustrating creation of halftone negative difference image data d16(−1).
Figure 11B:
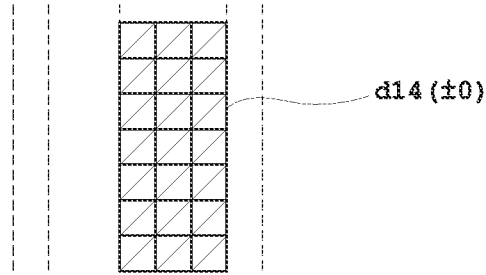
Figure 11C:
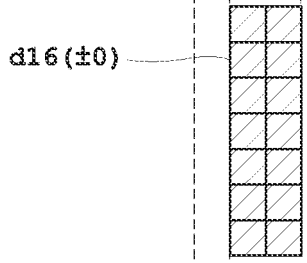
Figure 11D:
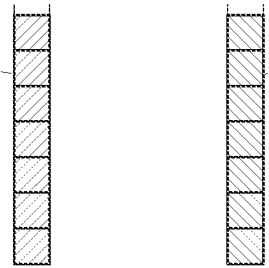

By subtracting the common image data d14(±0) and negative difference 0 image data d16(±0) from the negative shift image data d13(−1) shown in FIG. 11(a), negative difference image data d16(−1) are created as shown in FIG. 11(d). As shown in FIG. 11(d), the negative difference image data d16(−1) are created one each on the positive direction side and negative direction side of the common image data d14(±0). When these need to be distinguished in description, the positive difference image data d16(−1) on the positive direction side will be suffixed with "R" (right), and the negative difference image data d16(−1) on the negative direction side suffixed with "L" (left) The pair of these negative difference image data d16(−1) are stored as associated with the amount of positional deviation "−1 pixel" in the second memory 39 (S108 in FIG. 7).

Figure 12A:
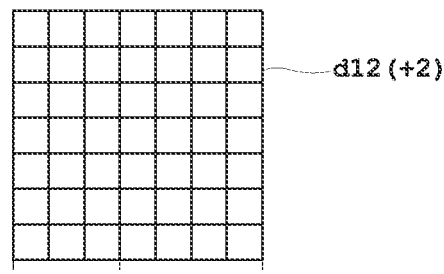
FIG. 12 is a schematic view illustrating creation of halftone positive difference image data d15(+2).
Figure 12B:
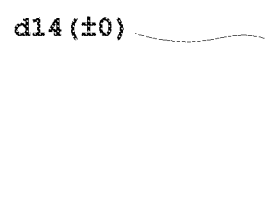
Figure 12C:
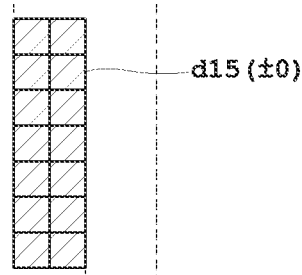
Figure 12D:

Here, as shown in FIG. 12(d), when the positive difference image data d15(+2) is created, the positive difference image data d15(+1) are subtracted from the positive shift image data d12(+2). The image shift amount of positive difference image data d15(+1) is "+1 pixel", which is relatively smaller than the image shift amount "+2 pixels" of the positive difference image data d15(+2). Thus, when the positive difference image data d15(+2) is created, the positive difference image data d15(+1) with the relatively small image shift amount are subtracted. There occurs no overlapping between the positive difference image data d15(+2) with the relatively large image shift amount and the positive difference image data d15(+1) with the relatively small image shift amount. This restrains the data amount of the positive difference image data d15.

Figure 12E:
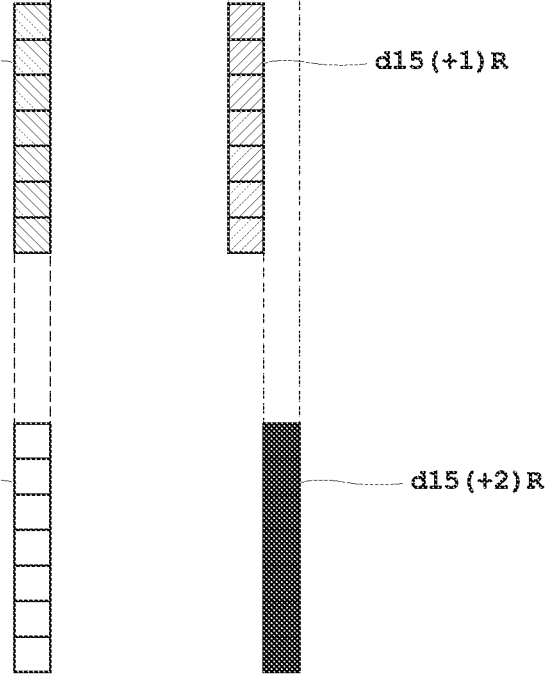

As shown in FIG. 12(e), the positive difference image data d15(+2) created is one (positive difference image data d15(+2)R) on the positive direction side of the positive difference image data d15(+1). Even if the common image data d14(±0) is subtracted from the positive shift image data d12(+2), actual data will not remain on the negative direction side, and therefore positive difference image data d15(+2)L on the negative direction side will be blank data. The positive difference image data d15(+2) is stored as associated with the amount of positional deviation "+2 pixels" in the second memory 39 (S108 in FIG. 7).

The above is generalized in the following (Equation 1):

positive difference image data $d15(+n)$=positive shift image data $d12(+n)$−common image data $d14(±0)$−positive difference 0 image data $d15(±0)$−positive difference image data $d15(+1)$−positive difference image data $d15(+2)$ ... −positive difference image data $d15(+(n-1))$   (Equation 1)

Figure 13A:
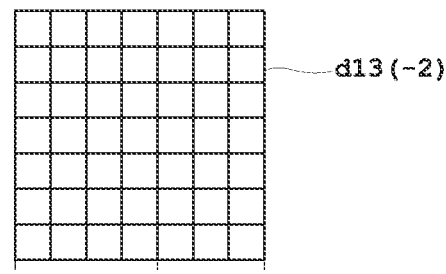
FIG. 13 is a schematic view illustrating creation of halftone negative difference image data d16(−2).
Figure 13B:
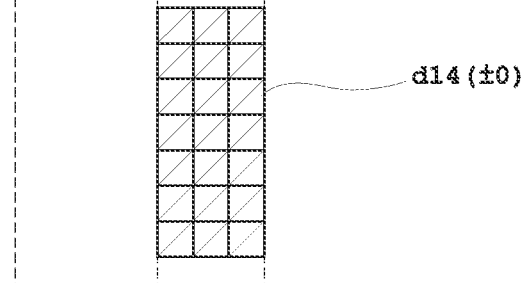
Figure 13C:
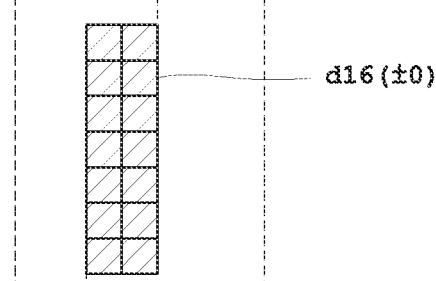
Figure 13D:
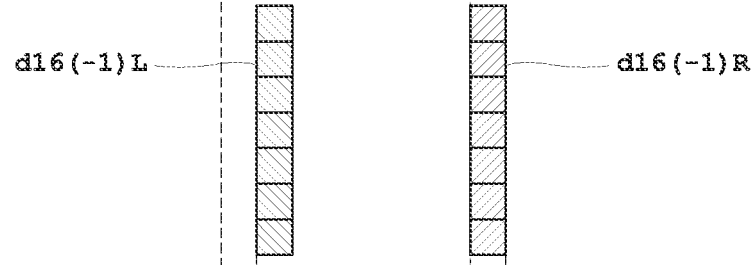
Figure 13E:
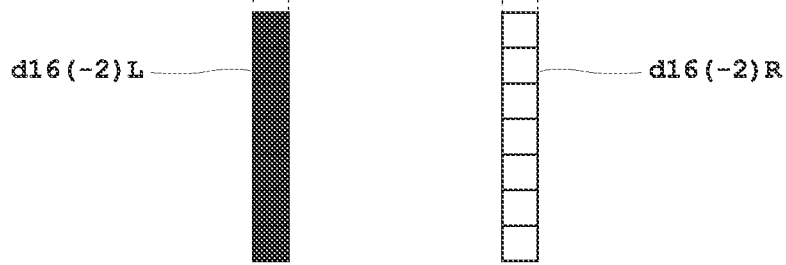
Figure 14A:
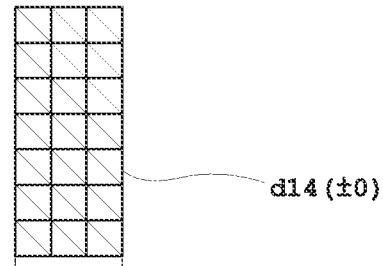
FIG. 14 is a schematic view illustrating creation of halftone image composite data.
Figure 14B:
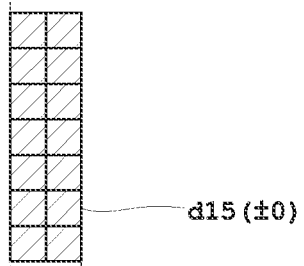
Figure 14C:
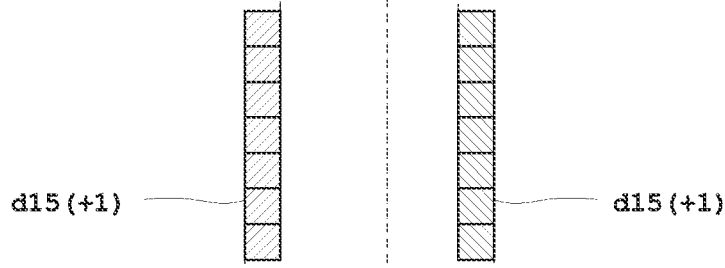
Figure 14D:
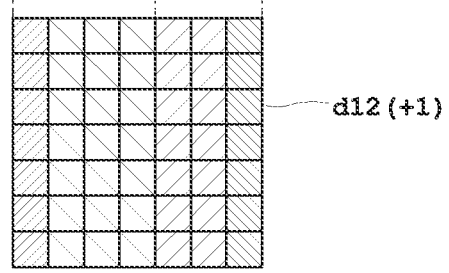
Figure 15A:
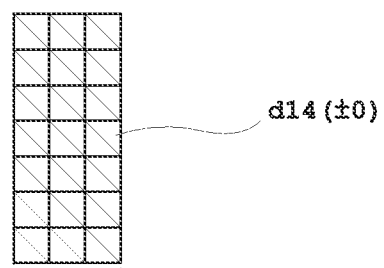
FIG. 15 is a schematic view illustrating creation of halftone image composite data.
Figure 15B:
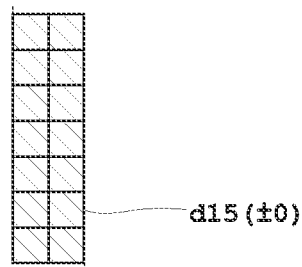
Figure 15C:
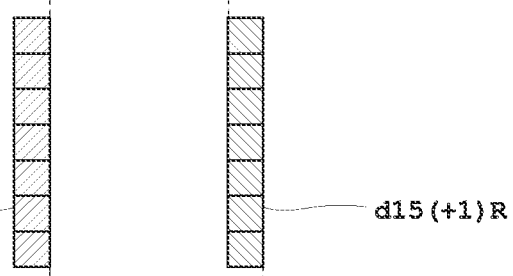
Figure 15D:
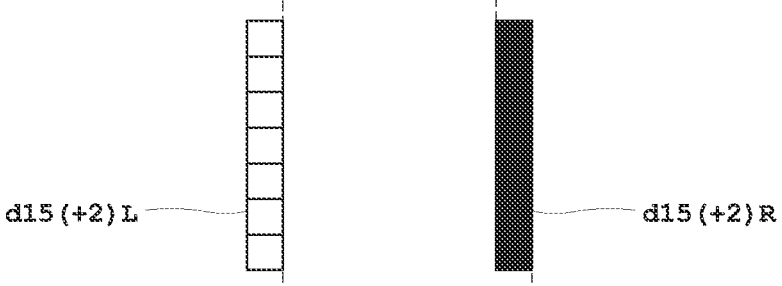
Figure 15E:
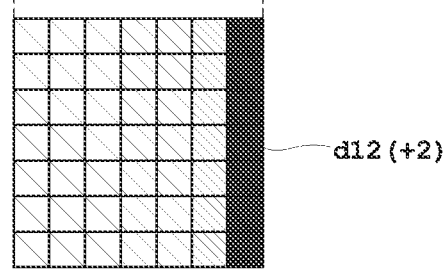
Figure 16A:
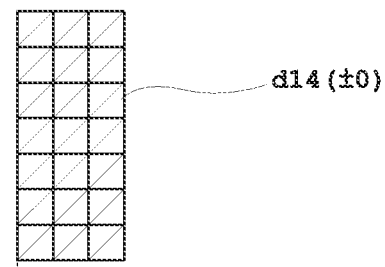
FIG. 16 is a schematic view illustrating creation of halftone image composite data.
Figure 16B:
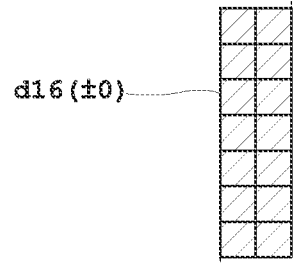
Figure 16C:
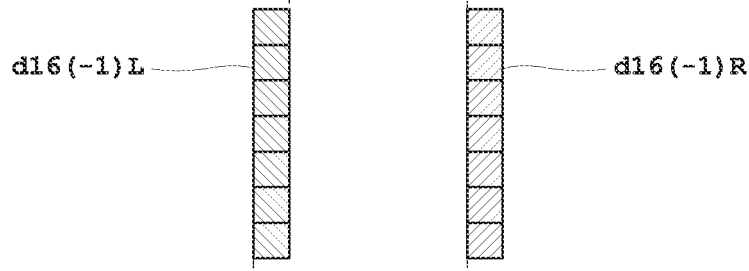
Figure 16D:
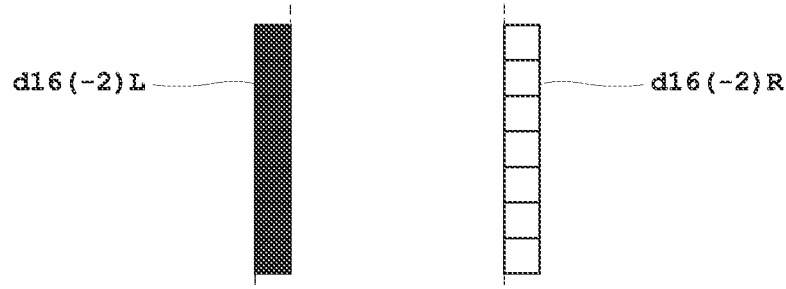
Figure 16E:
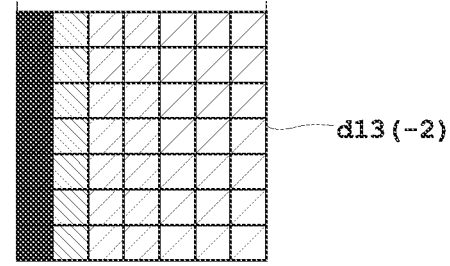

By subtracting the common image data d14(±0), negative difference 0 image data d16(±0), and negative difference image data d16(−1) from the negative shift image data d13(−2) shown in FIG. 13(a), negative difference image data d16(−2) is created as shown in FIG. 13(e).

Here, as shown in FIG. 13(d), when the negative difference image data d16(−2) is created, the negative difference image data d16(−1) is subtracted from the negative shift image data d13(−2). The image shift amount of negative difference image data d16(−1) is "−1 pixel", which is relatively smaller than the image shift amount "−2 pixels" of the negative difference image data d16(−2). Thus, when the negative difference image data d16(−2) is created, the negative difference image data d16(−1) with the relatively small image shift amount is subtracted. There occurs no overlapping between the negative difference image data d16(−2) with the relatively large image shift amount and the negative difference image data d16(−1) with the relatively small image shift amount. This restrains the data amount of the negative difference image data d16.

As shown in FIG. 13(e), the negative difference image data d16(−2) created is one (negative difference image data d16(−2)L) on the negative direction side of the negative difference image data d16(−1). Even if the common image data d14(±0), negative difference image data d16(±0), and negative difference image data d16(−1) are subtracted from the negative shift image data d13(−2), actual data will not remain on the positive direction side, and therefore negative difference image data d16(−2)R on the positive direction side will be blank data. The negative difference image data d16(−2) is stored as associated with the amount of positional deviation "−2 pixels" in the second memory 39 (S108 in FIG. 7).

The above is generalized in the following (Equation 2):

negative difference image data $d16(-n)$=negative shift image data $d13(-n)$−common image data $d14(\pm 0)$–negative difference 0 image data $d16$ $(\pm 0)$–negative difference image data $d16(-1)$–negative difference image data $d16(-2)$ ... –negative difference image data $d16(-(n-1))$  (Equation 2)

The process up to the above step S108 is a preliminary process leading to an actual start of printing.

Next, the operator instructs from an input device not shown to the controller 45 to start printing the original image data for printing on the web paper WP. The controller 45, in response to these instructions, controls the drive rollers 7 and 9 to start transporting the web paper WP (S109 in FIG. 7).

The controller 45 determines a printing area on the web paper WP where the original image data should be printed (S110 in FIG. 7).

The positional deviation amount calculator 29, with reference to the output of the detector 23, calculates an amount of positional deviation of the web paper WP in the printing area determined as above, and gives it to the composite image creator 41 (S111 in FIG. 7).

The composite image creator 41 reads image data corresponding to the amount of positional deviation from the second memory 39, and creates halftone composite image data using the image data read out (S112 in FIG. 7).

In the above modified example, the composite image data is created as follows. Reference is now made to FIG. 14. FIG. 14 is an image synthesis method for the case where the amount of positional deviation is "+1 pixel". The composite image creator 41, by reading from the second memory 39 and synthesizing, respectively, the common image data d14(±0), positive difference 0 image data d15(±0), and positive difference image data d15(+1) shown in FIGS. 14(*a*), (*b*), and (*c*), synthesizes halftone composite image data which corresponds to positive shift image data d12(+1) (FIG. 14(*d*)).

Next, reference is made to FIG. 15. FIG. 15 is an image synthesis method for the case where the amount of positional deviation is "+2 pixels". The composite image creator 41, by reading from the second memory 39 and synthesizing, respectively, the common image data d14(±0), positive difference 0 image data d15(±0), positive difference image data d15(+1), and positive difference image data d15(+2) shown in FIGS. 15(*a*), (*b*), (*c*), and (*d*), synthesizes halftone composite image data which corresponds to positive shift image data d12(+2) (FIG. 15(*e*)).

Here, the composite image creator 41, when the positive difference image data d15L is blank data on the negative direction side where the amount of positional deviation is the largest, carries out a data synthesis regardless of the difference image data d15L present on the negative direction side of the common image data d14(±0). In the example of FIG. 15, the positive difference image data d15(+2)L on the negative direction side where the amount of positional deviation is the largest is blank data. Consequently, the composite image creator 41 carries out a data synthesis regardless of the positive difference image data d15, i.e. d15(+1)L and d15(+2)L, present on the negative direction side of the common image data d14(±0). Consequently, the positive shift image data d12(+2) is synthesized as shown in FIG. 15(*e*).

The above is generalized in the following (Equation 3):

positive shift image data $d12(+n)$=common image data $d14(\pm 0)$+positive difference 0 image data $d15(\pm 0)$+positive difference image data $d15(+1)$+positive difference image data $d15(+2)$ ... + positive difference image data $d15(+n)$  (Equation 3)

However, when positive difference image data d15(+n)L on the negative direction side is blank data, image data is synthesized regardless of positive difference image data d15(+1)L, d15(+2)L, ..., and d15(+n)L on the negative direction side.

Next, reference is made to FIG. 16. FIG. 16 is an image synthesis method for the case where the amount of positional deviation is "−2 pixels". The composite image creator 41, by reading from the second memory 39 and synthesizing, respectively, the common image data d14(±0), negative difference 0 image data d16(±0), negative difference image data d16(−1), and negative difference image data d16(−2) shown in FIGS. 16(*a*), (*b*), (*c*), and (*d*), synthesizes halftone composite image data which corresponds to negative shift image data d13(−2) (FIG. 16(*e*)).

Here, the composite image creator 41, when the negative difference image data d16R is blank data on the positive direction side where the amount of positional deviation is the largest, carries out a data synthesis regardless of the difference image data d16R present on the positive direction side of the common image data d14(±0). In the example of FIG. 16, the negative difference image data d16(+2)R on the positive direction side where the amount of positional deviation is the largest is blank data. Consequently, the composite image creator 41 carries out a data synthesis regardless of the negative difference image data d16, i.e. d16(−1)R and d16(−2)R, present on the positive direction side of the common image data d14(±0). Consequently, halftone composite image data corresponding to the negative shift image data d13(−2) is synthesized as shown in FIG. 16(*e*).

The above is generalized in the following (Equation 4):

negative shift image data $d13(-n)$=common image data $d14(\pm 0)$+negative difference 0 image data $d16(\pm 0)$+negative difference image data $d16(-1)$+negative difference image data $d16(-2)$ ... +negative difference image data $d16(-n)$  (Equation 4)

However, when negative difference image data d16(−n)R on the positive direction side is blank data, image data is synthesized regardless of positive difference image data d16(−1)R, d16(−2)R, ..., and d16(−n)R on the positive direction side.

Returning to the flow chart of FIG. 7, the controller 45 operates the print head 13 through the drive circuit 43 to print on the web paper WP based on the composite image data (S113 in FIG. 7). Consequently, even when a positional deviation occurs due to a skew of the web paper WP, a positional deviation of the print image on the web paper WP can be suppressed.

The controller 45 moves to step S110 when continuing to print the original image data for printing, and ends the printing when there is no need for continuation (S114 in FIG. 7).

This modified example has the following two characteristics, and can therefore further cut down the data size of difference image data d15 and d16.

(A) Instead of storing common image data for each amount of positional deviation, common image data common to all amounts of positional deviation is stored (see FIG. 8).

(B) There occurs no overlap in holding of the same data between the positive difference image data d15 or between the negative difference image data d16 (see FIG. 12(*d*), (*e*) and FIG. 13(*d*), (*e*)).

As a result, the halftone positive difference image data d15(+x) and halftone negative difference image data d16(− x) for each amount of positional deviation can be made small. This can cut down the capacity of the second memory 39.

(3) In the foregoing embodiment, the images are shifted in units of one pixel. The unit of image shift may not be pixel by pixel. For example, the images may be shifted in units of two or more pixels or less than one pixel.

(4) In the foregoing embodiment, the detector 23 is disposed only upstream of the print head 13, but one may be disposed also downstream. The construction includes only one print head 13. This invention is applicable also to a construction including a plurality of print heads-13.

(5) The foregoing embodiment has been described taking the web paper WP as an example of printing media. The printing medium in this invention is not limited to web paper WP. For example, it may be cut sheet paper (single sheet paper) which is not continuous paper. Further, this invention is applicable not only to paper but plastic film, for example.

(6) In the foregoing embodiment, no reference is made whether the image data for printing is binary image or gradation image. This invention is also applicable to any of these.

INDUSTRIAL UTILITY

As described above, this invention is suitable for a printing apparatus, and a printing method therefor, which print with a print head on a printing medium transported.

REFERENCE SIGNS LIST

1 . . . sheet feeder
3 . . . inkjet printing apparatus
5 . . . takeup roller
WP . . . web paper
7, 11 . . . drive rollers
9 . . . transport rollers
X . . . transport direction
Y . . . width direction
13 . . . print head
21 . . . nozzles
23 . . . detector
RL . . . reference line
29 . . . positional deviation amount calculator
31 . . . image receiver
31a . . . first memory
31b . . . image shifter
33 . . . shading corrector
35 . . . halftone dot processor
37 . . . difference image creator
39 . . . second memory
41 . . . composite image creator
43 . . . drive circuit
45 . . . controller
d1 . . . halftone original correction image data
d2(+x), d3(−x) . . . halftone shift image data
d4(±x) . . . halftone common image data
d5(+x) . . . halftone positive difference image data
d6(−x) . . . halftone negative difference image data

What is claimed is:

1. A printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the apparatus comprising:
   a detector for detecting positions in the width direction of an end face of the printing medium relative to a reference line, wherein,
      based on an assumption of a pair of amounts of positional deviation by which the original image data deviates in the same distance positively and negatively in the width direction from the reference line, a pair of shift image data are created by shifting the original image data in the width direction according to the pair of amounts of positional deviation, and
      a pair of corrected shift image data are created from the pair of shift image data by performing a shading correction to uniform density variations according to dispensing characteristics of each nozzle among the plurality of nozzles;
   a halftone dot processor for performing a halftone dot process to express contrast in images, on the pair of corrected shift image data, thereby to create a pair of halftone shift image data, wherein
      halftone common image data is created which is a common part of the pair of halftone shift image data, respectively,
      halftone positive difference image data and halftone negative difference image data are created which are differences between the halftone common image data and the halftone positive difference image data and halftone negative difference image data, respectively, and
      the halftone common image data, the halftone positive difference image data, and the halftone negative difference image data are further created by a pair of positional deviation with the distance changed, and the halftone common image data, the halftone positive difference image data, and the halftone negative difference image data are created for each of plural pairs of amounts of positional deviation;
   a memory for storing the halftone common image data, the halftone positive difference image data, and the halftone negative difference image data as associated with the plural pairs of amounts of positional deviation, wherein
      halftone composite image data is created, based on the amounts of positional deviation received from the detector, and by reading from the memory and synthesizing the halftone positive difference image data or the halftone negative difference image data and the halftone common image data are created corresponding to the amounts of positional deviation in a position of the print head; and
   a controller for operating the print head to print on the printing medium based on the halftone composite image data.

2. The printing apparatus according to claim 1, wherein the detector is disposed upstream in the transport direction of the print head.

3. A printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the apparatus comprising:

a detector for detecting positions in the width direction of an end face of the printing medium relative to a reference line, wherein based on an assumption of amounts of positional deviation in the width direction from the reference line, a plurality of shift image data are created by shifting the original image data in the width direction according to the amounts of positional deviation, and corrected original image data and a plurality of corrected shift image data are created by performing a shading correction on the original image data and the shift image data to uniform density variations according to dispensing characteristics of each nozzle among the plurality of nozzles;

a halftone dot processor for performing a halftone dot process to express contrast in images, on the corrected original image data and the plurality of corrected shift image data, thereby to create halftone original image data and a plurality of halftone shift image data, wherein halftone common image data is created which is a common part of the halftone original image data and the plurality of halftone shift image data, respectively, halftone positive difference image data and halftone negative difference image data are created which are differences between the halftone common image data and the halftone positive difference image data and halftone negative difference image data, respectively, and halftone difference zero image data is obtained which is a difference between the halftone original image data and the halftone common image data, and subtracting the halftone common image data and the halftone difference zero image data from each halftone shift image data, thereby obtain halftone difference image data for each of the plurality of halftone shift image data;

a memory for storing the halftone common image data and the halftone difference zero image data, and storing the plurality of halftone difference image data as associated with the amounts of positional deviation, wherein halftone composite image data is created, based on the amounts of positional deviation received from the detector, and by reading from the memory the halftone difference image data are created corresponding to the amounts of positional deviation in a position of the print head and synthesizing the read-out halftone difference image data with the halftone common image data and the halftone difference zero image data; and a controller for operating the print head to print on the printing medium based on the halftone composite image data, wherein the plurality of halftone difference image data are created in a way to avoid a mutual overlapping of the image data.

4. A printing method for a printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the method comprising:

receiving the original image data;

creating, based on an assumption, regarding positions in the width direction of an end face of the printing medium relative to a reference line, that a pair of amounts of positional deviation occur in the same distance positively and negatively in the width direction from the reference line, a pair of shift image data by shifting the original image data in the width direction according to the pair of amounts of positional deviation;

creating a pair of corrected shift image data from the pair of shift image data by performing a shading correction to uniform density variations according to dispensing characteristics of each nozzle among the plurality of nozzles;

performing a halftone dot process to express contrast in images, on the pair of corrected shift image data, thereby to create a pair of halftone shift image data;

creating halftone common image data which is a common part of the pair of halftone shift image data, respectively, creating halftone positive difference image data and halftone negative difference image data which are differences between the halftone common image data and the halftone positive difference image data and halftone negative difference image data, respectively, further creating the halftone common image data, the halftone positive difference image data, and the halftone negative difference image data by a pair of positional deviation with the distance changed, and creating the halftone common image data, the halftone positive difference image data, and the halftone negative difference image data for each of plural pairs of amounts of positional deviation;

storing in memory the halftone common image data, the halftone positive difference image data, and the halftone negative difference image data as associated with the plural pairs of amounts of positional deviation;

creating halftone composite image data, based on the amounts of positional deviation, and by reading from the memory and synthesizing the halftone positive difference image data or the halftone negative difference image data and the halftone common image data corresponding to the amounts of positional deviation in a position of the print head; and operating the print head to print on the printing medium based on the halftone composite image data.

5. A printing method for a printing apparatus having a transport device for transporting a printing medium in a transport direction, and a print head with a plurality of nozzles arranged in a width direction of the printing medium perpendicular to the transport direction for dispensing ink toward the printing medium, printing being performed on the printing medium by the print head based on original image data for printing which is data for printing, while transporting the printing medium in the transport direction by the transport device, the method comprising:

receiving the original image data;

creating, based on an assumption, regarding positions in the width direction of an end face of the printing medium relative to a reference line, that amounts of positional deviation occur in the width direction from the reference line, a plurality of shift image data by shifting the original image data in the width direction according to the amounts of positional deviation;

creating corrected original image data and a plurality of corrected shift image data by performing a shading correction on the original image data and the shift image data to uniform density variations according to dispensing characteristics of each nozzle among the plurality of nozzles;

performing a halftone dot process to express contrast in images, on the corrected original image data and the plurality of corrected shift image data, thereby to create halftone original image data and a plurality of halftone shift image data;

creating halftone common image data which is a common part of the halftone original image data and the plurality of halftone shift image data, respectively, creating halftone positive difference image data and halftone negative difference image data which are differences between the halftone common image data and the halftone positive difference image data and halftone negative difference image data, respectively, obtaining halftone difference zero image data which is a difference between the halftone original image data and the halftone common image data, and subtracting the halftone common image data and the halftone difference zero image data from each halftone shift image data, thereby obtaining halftone difference image data for each of the plurality of halftone shift image data;

storing the halftone common image data and the halftone difference zero image data, and storing the plurality of halftone difference image data as associated with the amounts of positional deviation;

creating halftone composite image data, based on the amounts of positional deviation detected, and by reading the halftone difference image data corresponding to the amounts of positional deviation in a position of the print head for synthesis with the halftone common image data and the halftone difference zero image data; and operating the print head to print on the printing medium based on the halftone composite image data, wherein the plurality of halftone difference image data are created in a way to avoid a mutual overlapping of the image data.

\* \* \* \* \*